P. TYSSELING.
RESILIENT WHEEL.
APPLICATION FILED JAN. 13, 1914.
1,113,514. Patented Oct. 13, 1914.
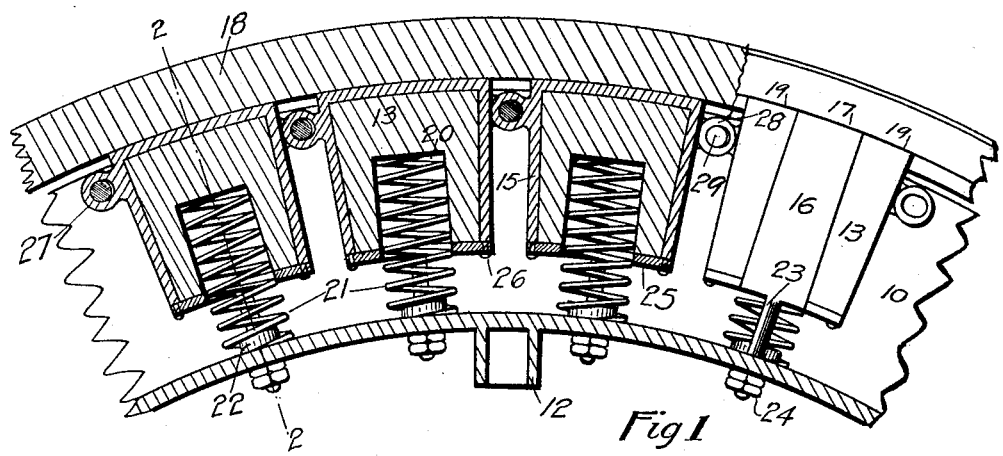
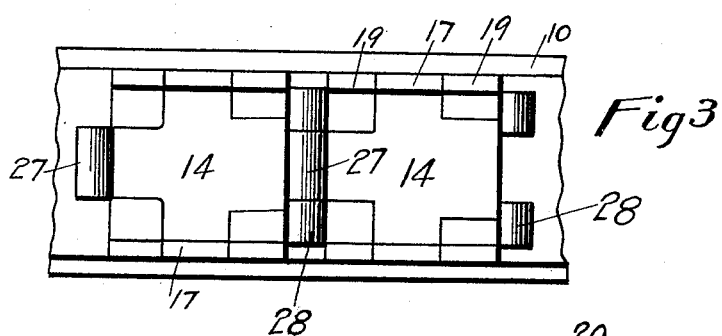
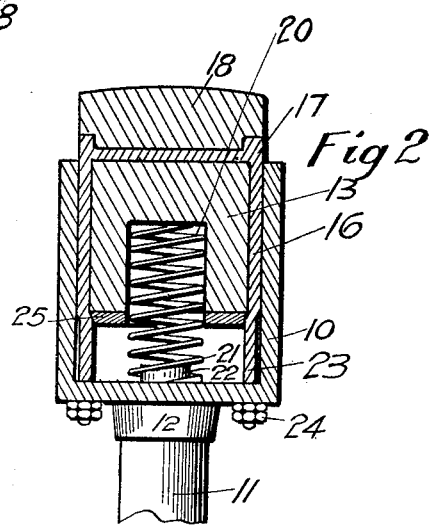
WITNESSES
F. Segelcke.
Will Freeman
INVENTOR.
Peter Tysseling.
BY
ATTORNEYS.

UNITED STATES PATENT OFFICE.

PETER TYSSELING, OF PELLA, IOWA.

RESILIENT WHEEL.

1,113,514. Specification of Letters Patent. Patented Oct. 13, 1914.

Application filed January 13, 1914. Serial No. 811,874.

*To all whom it may concern:*

Be it known that I, PETER TYSSELING, a citizen of the United States, and resident of Pella, in the county of Marion and State of Iowa, have invented a certain new and useful Resilient Wheel, of which the following is a specification.

The object of my invention is to provide a resilient wheel of simple, durable and inexpensive construction.

More particularly it is my object to provide a wheel of the kind mentioned, made of a plurality of sections suitably pivoted together, said sections being made of an inexpensive material such as wood reinforced in a particular way by a specially formed metal casing whereby the cheap material may be protected from wear to increase the durability of the wheel, and whereby the blocks or sections may be protected against splitting along the grain of the wood.

Still a further object is to provide such a plurality of sections yieldingly mounted with relation to the rim of a wheel.

My invention consists in certain details, in the construction, combination and arrangement of the various parts of the device, whereby the objects contemplated are attained, as hereinafter more fully set forth, pointed out in my claims and illustrated in the accompanying drawings, in which:

Figure 1 shows a vertical, sectional view through a portion of a wheel rim equipped with a resilient tire, embodying my invention, one of the sections being shown in side elevation. Fig. 2 is a transverse, vertical, sectional view, taken on the line 2—2 of Fig. 1. Fig. 3 is a plan view of a portion of the outside of the tire with the cushion tire removed, two of the sections only being shown.

In the accompanying drawings I have used the reference numeral 10 to indicate generally the channel bar which constitutes the circular rim of a wheel and is mounted on the spokes 11. The channel bar 10 opens outwardly and is provided with inwardly extending sockets 12 to receive the ends of spokes.

My resilient tire is made of a plurality of sections arranged circumferentially around the wheels and suitably pivoted together in succession in the manner hereinafter described. Each section comprises a block 13, which is preferably made of wood, hard rubber or some comparatively inexpensive material. The blocks or sections 13 are preferably somewhat thicker adjacent to their tread portions than at their inner portions so that they have somewhat the shape of a truncated wedge, as shown in Fig. 1. Blocks made of such inexpensive material are necessarily such that they will readily wear if directly exposed to the friction of the roadway and I have therefore provided means for protecting the blocks and connecting them together, which will now be described.

Mounted on the tread surface of each block and countersunk therein, is a metal protecting member 14, preferably having the shape of a cross with the arms extending to the end edges of the block or member 13. The member 14 is provided with inward extensions 15, countersunk in the ends of each block 13 and with extensions 16 countersunk in the sides of each block 13. The surfaces of the members 14 are provided, adjacent to the extensions 16, with outwardly extending flanges 17 designed to receive between them a cushion tire or the like 18.

The blocks or sections 13 are provided with rods or flanges 19 in line with the respective flanges 17, as clearly shown in Fig. 3. In the under surface of each section 13 is a central opening 20, so arranged as to receive a powerful coil spring 21, the inner end of which is mounted on a lug 22 in the bottom of the channel 10, whereby lateral movement of the spring 21 is prevented. The size of each spring 21 is such that it normally holds the block 13 spaced apart from the bottom of the channel 10, as shown in Figs. 1 and 2. The inner ends of the members 16 and 15 extend to a position flush with the inner surface of the block 13. The members 16 are provided at their inner ends with extensions 23 which are inclined toward each other somewhat just below the inner surface of the member 13 and then inclined to and through the bottom of the channel 10. The members 16 are of somewhat resilient material and on account of the form of the extensions 23, the members 23 and 16 may be sprung apart for placing the block 13 in position between them, after which they may be released and the extensions 23 will hold the block in position. The extensions 23 have the form of bolts and their ends are screw-threaded to receive the nuts 24. The smooth shanks of the bolt shaped extensions 23 are slidably extended through the bottom of the channel shaped rim 10, so as to permit the member 13 to move inwardly and outwardly in said channel. The members 13 are arranged in a series circumferentially around the channel 10 and received between its side walls so that the tread portions of said members 13 may extend slightly out of the channel 10. Secured to the under surface of each member 13 is a plate 25 having a central opening to receive the spring 21 and permit said spring to move freely, and having in its sides openings to receive the short downward extensions 26 formed on the members 15. The members 26 may be extended through the openings in the sides of the members 25 and are secured to said members 15. The members 16 are preferably made of somewhat resilient material, preferably steel, so that the portions 23 may be sprung apart for fitting the member 14 and the extensions 15 and 16 over the block 13. It will thus be seen that the members 23 will hold the block 13 in position after it has once been thus placed. Formed on one of the members 15 on each block, near the tread portion of the block, is a laterally extending cylinder or bearing 27 preferably about as long as the member 15 is wide, as shown in Fig. 3. Formed on the opposite extension 15 of each member 14 are laterally extending wings on which are formed bearings or cylinders 28.

The bearings 28 are so located with relation to the bearing 27 that the bearing 27 of one of the tire sections is received between the bearings 28 of the next succeeding tire section and a pin or shaft 29 is extended through the three, connecting them together. The bearings are preferably provided with elliptical openings to permit some play between the tire sections. The tire may be used without any outer rubber cushion 18 if desired.

In the practical use of my improved resilient tire the members are arranged as hereinbefore set forth and the springs 21 afford sufficient resiliency to the tire.

My tire has a number of advantages, particularly in the special construction of the blocks 13, the members 14 and the extensions thereof, whereby I am enabled to use wood or other suitable inexpensive material and to thoroughly protect and support the same, while at the same time reducing the weight of the device from what it would be if it were entirely of metal. It should be mentioned that the member 14 is countersunk in the outer or tread surface of the block 13.

A number of changes may be made in the details of my resilient wheel without departing from its essential features and it is my intention to cover by this application any such changes in construction which may be included within the scope of the following claims.

I claim as my invention:

1. In a device of the class described, a rim comprising a channel opening outwardly, a plurality of tire sections mounted therein, each comprising a block having a central opening in its lower surface to receive a spring, a spring mounted in said opening and supported in the bottom of said channel, a metal case countersunk in the outer surface of said block and having extensions countersunk in the sides and ends of said block and extending to the lower surface thereof, two extensions at the sides of said block having bolts formed on their inner ends, slidably mounted in the bottom of said channel, said bolts being inclined slightly toward each other adjacent to the lower surface of the block, the side extension of said casing being made of somewhat resilient material to permit said side extensions to be sprung apart for inserting the block into the casing, and means for pivoting said casings together in succession to permit some play of said blocks.

2. In a device of the class described, a rim comprising a channel opening outwardly, a plurality of tire sections mounted therein, each comprising a block having a central opening in its lower surface to receive a spring, a spring mounted in said opening and supported in the bottom of said channel, a metal case countersunk in the outer surface of said block and having extensions countersunk in the sides and ends of said block and extending to the lower surface thereof, two extensions at the sides of said block having bolts formed on their inner ends, slidably mounted in the bottom of said channel, said bolts being inclined slightly toward each other adjacent to the lower surface of the block, the side extension of said casing being made of somewhat resilient material to permit said side extensions to be sprung apart for inserting the block into the casing, means for pivoting said casings together in succession to permit some play of said blocks, and a plate on the lower surface of each block having a central opening to permit the free reception of said spring, said plate being secured to the end extensions of said casing.

3. In a device of the class described, a rim comprising a channel opening outwardly, a plurality of tire sections mounted therein, each comprising a block having a central opening in its lower surface to receive a spring, a spring mounted in said opening and supported in the bottom of said channel, a metal case countersunk in the outer surface of said block and having extensions countersunk in the sides and ends of said block and extending to the lower surface thereof, two extensions at the sides of said block having bolts formed on their inner ends, slidably mounted in the bottom of said channel, said bolts being inclined slightly toward each other adjacent to the lower surface of the block for holding the block between them, the side extension of said casing being made of somewhat resilient material to permit said side extension to be sprung apart for inserting the block into the casing, a plate on the lower surface of each block having a central opening to permit the free reception of said spring, said plate being secured to the end extensions of said casing, a cylinder formed on one of the end extensions of each casing near the tread portion thereof and spaced cylinders formed on the opposite end extension of each casing, designed to form bearings in line with the adjacent single cylinder of the next successive block casing, said blocks being arranged in succession with said cylinders in line with each other, pins extending through the adjacent cylinders of the successive blocks.

Des Moines, Iowa, January 6, 1914.

PETER TYSSELING.

Witnesses:
  P. H. STUBEURAUCK,
  GEO. G. GAASS.

---

Copies of this patent may be obtained for five cents each, by addressing the "Commissioner of Patents, Washington, D. C."